United States Patent
Vas et al.

(10) Patent No.: US 9,149,984 B2
(45) Date of Patent: Oct. 6, 2015

(54) METHOD FOR JOINING A FIRST COMPONENT FORMED OF A PLASTIC MATERIAL TO A SECOND COMPONENT, AND JOINING ELEMENT AND DEVICE

(75) Inventors: Peter Vas, Bremen (DE); Stephan Vissers, Bremen (DE)

(73) Assignee: AIRBUS DEUTSCHLAND GMBH, Hamburg (DE)

(*) Notice: Subject to any disclaimer, the term of this patent is extended or adjusted under 35 U.S.C. 154(b) by 383 days.

(21) Appl. No.: 13/092,723

(22) Filed: Apr. 22, 2011

(65) Prior Publication Data

US 2011/0192523 A1 Aug. 11, 2011

Related U.S. Application Data

(63) Continuation of application No. 11/916,327, filed as application No. PCT/EP2006/003093 on Apr. 5, 2006, now abandoned.

(60) Provisional application No. 60/694,753, filed on Jun. 28, 2005.

(30) Foreign Application Priority Data

Jun. 1, 2005 (DE) .......................... 10 2005 025 096

(51) Int. Cl.
*B29C 65/00* (2006.01)
*B29C 65/06* (2006.01)
(Continued)

(52) U.S. Cl.
CPC ............. *B29C 66/47* (2013.01); *B29C 65/0618* (2013.01); *B29C 65/0627* (2013.01);
(Continued)

(58) Field of Classification Search
CPC B29C 65/06; B29C 65/0672; B29C 65/0681; B29C 65/7808; B29C 65/7811; B29C 66/47; B29C 66/472; F16B 37/061; B23K 20/122
USPC .............. 29/432.2, 525.13, 525.15, 240, 505; 156/73.5; 228/2.3
See application file for complete search history.

(56) References Cited

U.S. PATENT DOCUMENTS 3,468,732 A * 9/1969 Hewitt .......................... 156/73.5
3,547,741 A * 12/1970 Hewitt .......................... 156/579
(Continued)

FOREIGN PATENT DOCUMENTS

JP 60132739 A 7/1985
JP 09222110 A 8/1997
(Continued)

OTHER PUBLICATIONS

Russian Office Action dated Feb. 16, 2006, application No. 10 2005 025 096.3-16, 2 pages.

*Primary Examiner* — Christopher M Koehler
(74) *Attorney, Agent, or Firm* — Christopher Paradies; Paradies Law P.A.

(57) ABSTRACT

A method for joining a first component made of a plastic material, in particular a thermoplastic and/or thermosetting plastic material, to a second component by applying a joining element on the first component, wherein the joining element has a supporting plate formed of a thermoplastic and/or thermosetting plastic material and comprising a connecting means and a supporting plate bore. A joining element for creating a junction in accordance with the method, is also disclosed. Furthermore, a device, in particular for performing the method, is disclosed.

11 Claims, 3 Drawing Sheets

(51) Int. Cl.
  *B29C 65/56* (2006.01)
  *F16B 33/00* (2006.01)
  *F16B 37/04* (2006.01)
  *F16B 37/06* (2006.01)
  *B29C 65/04* (2006.01)
  *B29C 65/08* (2006.01)
  *B29K 63/00* (2006.01)
  *B29K 71/00* (2006.01)
  *B29K 79/00* (2006.01)
  *B29K 101/10* (2006.01)
  *B29K 101/12* (2006.01)
  *B29K 307/00* (2006.01)

(52) U.S. Cl.
  CPC ............ *B29C65/0672* (2013.01); *B29C 65/56* (2013.01); *B29C 65/562* (2013.01); *B29C 66/45* (2013.01); *B29C 66/8322* (2013.01); *F16B 33/006* (2013.01); *F16B 37/046* (2013.01); *F16B 37/061* (2013.01); *B29C 65/04* (2013.01); *B29C 65/08* (2013.01); *B29C 65/561* (2013.01); *B29C 66/472* (2013.01); *B29C 66/71* (2013.01); *B29C 66/7212* (2013.01); *B29C 66/9512* (2013.01); *B29C 66/9513* (2013.01); *B29C 66/9516* (2013.01); *B29C 66/9517* (2013.01); *B29K 2063/00* (2013.01); *B29K 2071/00* (2013.01); *B29K 2079/085* (2013.01); *B29K 2101/10* (2013.01); *B29K 2101/12* (2013.01); *B29K 2307/00* (2013.01)

(56) References Cited

U.S. PATENT DOCUMENTS

| | | | | |
|---|---|---|---|---|
| 3,661,661 | A | * | 5/1972 | Berleyoung ............... 156/580.1 |
| 4,427,471 | A | * | 1/1984 | Chierici ...................... 156/73.5 |
| 4,551,189 | A | * | 11/1985 | Peterson .................... 156/73.5 |
| 4,824,304 | A | * | 4/1989 | Shibayama et al. .......... 411/171 |
| 5,536,344 | A | * | 7/1996 | van Dreumel ............... 156/73.5 |
| 5,713,706 | A | | 2/1998 | Lozano |
| 5,879,115 | A | | 3/1999 | Medal |
| 6,318,927 | B1 | * | 11/2001 | Schafer et al. ............. 403/408.1 |
| 6,458,240 | B1 | * | 10/2002 | Bouchette et al. ................ 162/4 |
| 6,604,900 | B2 | * | 8/2003 | Ikami et al. .................... 411/181 |
| 2003/0099254 | A1 | | 5/2003 | Richter |
| 2003/0099524 | A1 | * | 5/2003 | Chen ............................ 411/429 |
| 2008/0206012 | A1 | * | 8/2008 | Vas et al. ...................... 411/171 |

FOREIGN PATENT DOCUMENTS

| | | |
|---|---|---|
| SU | 350286 | 9/1972 |
| WO | 2005021249 A1 | 3/2005 |

\* cited by examiner

METHOD FOR JOINING A FIRST COMPONENT FORMED OF A PLASTIC MATERIAL TO A SECOND COMPONENT, AND JOINING ELEMENT AND DEVICE

REFERENCE TO RELATED APPLICATIONS

This application is a continuation of U.S. Non-Provisional application Ser. No. 11/916,327 filed Dec. 28, 2007, which claims the benefit of the filing date of German Patent Application No. 10 2005 025 096.3 filed Jun. 1, 2005 and U.S. Provisional Application No. 60/694,753 filed Jun. 28, 2005, the disclosures of which are hereby incorporated herein by reference in their entirety.

FIELD OF THE INVENTION

The field relates to a method for joining a first component formed of a plastic material, the plastic material including a thermoplastic and/or thermosetting plastic material, to a second component by applying a joining element on the first component, a joining element for creating a junction in accordance with the method, and a device, in particular for performing the method for creating a junction between a first component formed of a plastic material, in particular a thermoplastic and/or thermosetting plastic material, and a second component using the joining element.

BACKGROUND OF THE INVENTION

Joining plate-shaped components, which only have low material thickness with respect to superficial extent, to other components or components also realized in plate-shape proves to be costly, because on many occasions, due to the low material thickness, joining screws, rivets, or the like, may not be inserted directly into the components.

To provide such junctions, e.g., so called plate nuts, are implemented in the aircraft or automotive industry. Known embodiments of plate nuts have a base plate with a substantially rectangular basis, which tapers at both end regions. The base plate has a center bore, arranged approximately in the middle. In both end regions of the base plate, respectively, one fastening bore is incorporated. The longitudinal edges of the base plate are flanged in the region of the center bore for receiving a fastening nut. Herein, the fastening nut is received in the base plate so that an equalization of tolerances is possible in two spatial directions, in parallel to the base plate.

Alternatively, a fastening spring for connecting the fastening nut to the base plate, may be used. The fastening spring is then-held by retaining cams with recesses, arranged on both sides in parallel to the longitudinal sides of the base plate. For replacing the fastening nut, the fastening spring may be taken out of the recesses. In this variant as well, an equalization of tolerances is possible due to the fastening nut received by means of the fastening spring to be movable in two spatial directions in parallel to the base plate.

For producing a junction between a first and second component, the plate nut is initially fastened on the first component. For this purpose, initially two holes are incorporated into the first component, substantially coincidentally with the fastening bores in the base plate. Afterwards, the base plate with the first component is joined to the second component by two rivets inserted into the fastening bore. Afterwards, in the region of the center bore of the plate nut, another bore is incorporated into the first component, which bore is e.g. for passing a stud. This bore may be incorporated before fastening the plate nut on the first component. Finally,-a stud or the like, is guided through a bore in the second component, the stud being screwed down with the fastening nut for the effective junction of the first component with the second component.

Other methods or joining means for producing such junctions may get by with one center bore in the first component. Fastening of the plate nut is herein performed by expanding a sleeve surrounding the center bore of the plate nut inside the bore of the first component, similarly to fastening a so called "pop rivet". Expanding the sleeve may then be performed by a disposable drift pin, which is drawn through the sleeve using a tool. During the production process of the joining element, this drift pin may be inserted into the sleeve. Alternatively, expanding may also be performed by a separate pin, which is inserted into the sleeve only when the joining element is mounted, and which is removed at the end of the expanding operation and may be reused. As a result of the central fastening of the plate nut in the first component, it is not necessary in either variant to join the plate nut to the first component by two separate rivets.

Due to a plurality of steps, the above mentioned methods or joining means require relatively intensive installation work. Furthermore, in particular in components with fiber reinforced plastic materials, there is the risk of delaminations in the region of the junctions. Such delaminations may occur, in regions wherein a mechanical load of the material is produced in parallel to the preferred fiber orientation, as is the case in particular in rivet joints, screw joints, or when expanding sleeves in bores in fiber reinforced plastic materials. Both the rivets for fastening the plate nut and the expansible sleeve for central fastening of the plate nut moreover imply the risk of corrosion processes because components made of different materials are adjacent.

SUMMARY OF THE INVENTION

Amongst other things, it may be an object to provide a method, a joining element, and a device for simple and fast production of junctions between in particular plate-shaped components, wherein at least one component may be formed in particular of a thermoplastic plastic material. Moreover, it may be an object to reduce delaminations as well as corrosion processes in the region of the junctions produced.

A method for joining a first component, formed of a plastic material, in particular, a thermoplastic and/or thermosetting plastic material, to a second component by applying a joining element on the first component, wherein the joining element has a supporting plate formed of a thermoplastic and/or thermosetting plastic material and comprising a connecting means and a supporting plate bore, comprises the steps of:
  incorporating a bore into the first component,
  welding the supporting plate to the first component, and
  joining the first component and the second component by incorporating a joining means arranged on the second component into the connecting means.

By producing a weld joint between the first component, formed in particular of a thermoplastic and/or thermosetting plastic material, and a supporting plate of the joining element, both components may be joined to each other rapidly and easily, where only the incorporation of a bore into the first component is required. Herein, it is assumed that the first component is formed of a thermoplastic and/or thermosetting plastic material, which may also have fiber reinforcement, and a thermosetting plastic material may be provided with an interface layer, preferably formed of a thermoplastic plastic material, at least in the region of the weld joint to be produced, so as to enable the weldability with the supporting plate of the joining element.

The weld joint between the first component and the retaining plate of the joining element allows for a connection with high mechanical load capacity of the joining element to the first component without significant weakening of the material or the risk of delaminations to occur. Moreover, the risk of corrosion processes to occur is decreased because at least in the region of the weld joint, only materials of the same kind are adjacent.

In that the supporting plate is realized so as to be weldable to the first component, a simple and fast production of a junction between a first component, formed of a thermoplastic and/or thermosetting plastic material, to a second component may be ensured. Moreover, as a result of the supporting plate being weldable to the first component, the risk of the formation of delaminations and corrosion processes may decrease due to a reduction of the number of bores required for fastening. Also, the supporting plate of the joining element may be joined solidly to the first component without the risk of material weakening as a result of the incorporation of bores or rivets for fastening. Eventually, because of the welding operation, the joining element becomes an integral part of the first component.

In that the junction for producing a weld joint is realized between the first component and the joining element, junctions between two components, in particular plate-shaped ones, may be produced simply and rapidly with the advantages already mentioned above.

Due to welding of the supporting plate to the first component, a rivet joint, otherwise generally required for joining the supporting plate to the first component, may be omitted, whereby the production of a junction by means of the inventive joining means is considerably simplified. Moreover, weakening of the first component as well as formation of corrosion processes due to different materials used for riveting being adjacent may be avoided.

BRIEF DESCRIPTION OF THE FIGURES

In the drawings, similar structural elements are provided with the same reference symbols.

DETAILED DESCRIPTION

The examples described and drawings rendered are illustrative and are not to be read as limiting the scope of the invention as it is defined by the appended claims.

Figure 1:
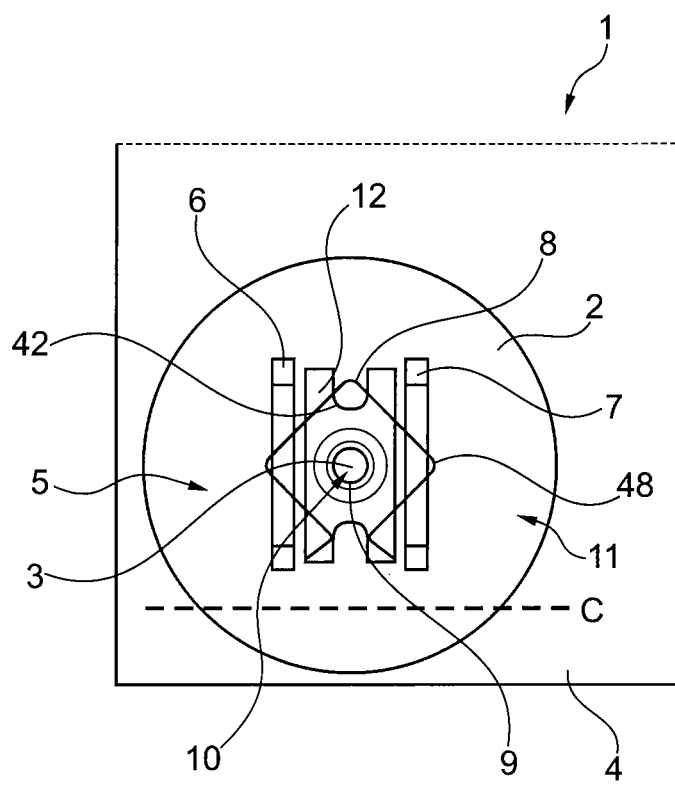
FIG. 1 shows a top view of an example of a joining element.

FIG. 1 shows a top view of the joining element.

The joining element 1 comprises among other things, a supporting plate 2, for example, a circular shape, into which a supporting plate bore 3 is incorporated approximately in the middle. The supporting plate 2 may also have a geometric shape which differs from the circular shape. The supporting plate 2 is joined to the first component 4 by a weld joint.

In order to enable a weld joint between the first component 4 and the supporting plate 2 of the joining element 1, the supporting plate 2, in one example, is formed of a thermoplastic plastic material, which additionally may have fiber reinforcement. The supporting plate 2 may be formed of a polymeric material, such as polyetheretherketone (PEEK), polyetherimide (PEI), or other polymeric material.

Alternatively, the supporting plate 2 may be of a thermosetting material, with a bottom side of the supporting plate 2 being made of a thermoplastic interface layer as a bottom side 13, which is not illustrated in FIG. 1. In this case, an interface layer 31 is formed of a thermoplastic plastic material and is used to improve the weldability with the first component 4.

Figure 4:
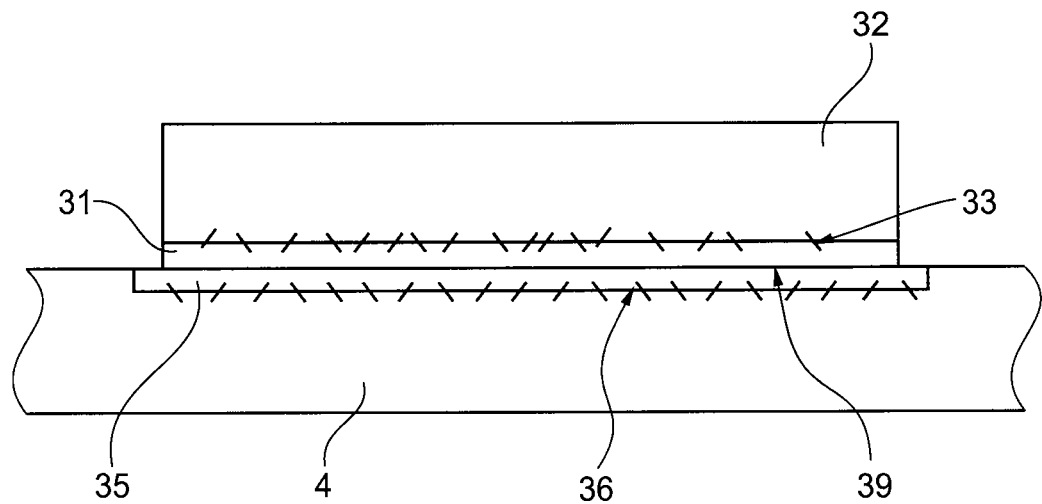
FIG. 4 illustrates a cross section along line C of FIG. 1 for one example of a supporting plate including thermosetting base having fiber reinforcement joined to a thermoplastic interface layer welded to a first component 4 of similar construction.
Figure 5:
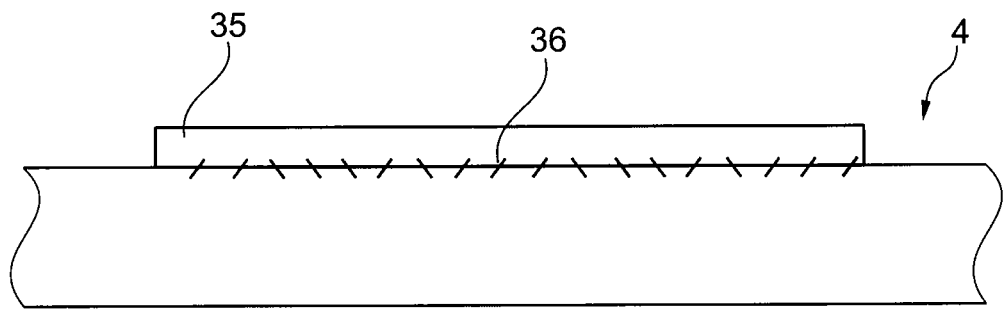
FIG. 5 illustrates an alternative example of a first component.

As illustrated in FIG. 4, an interface layer 31 joined to a thermosetting material may be by spreading, gluing, rolling, baking, pressing, burning. In one example, a base 32 of a thermosetting material may have fiber reinforcement and a plurality of fibers 33 protruding protrude from the surface of the base material. Intimate interleaving of the fibers 33 between the base thermosetting material 32 and an applied interface layer joins the two materials interface layer 31, which may be made of the same thermo plastic material as the surface 18 of the first component 4. of the joining element 1, such as polyetheretherketone (PEEK), polyetherimide (PEI), or other polymeric materials. The interleaving of a plurality of fibers 33 across the interface between the fiber reinforced. Thermosetting material portion 32 and the thermoplastic interface layer 31 of the supporting plate 2, of this example, provides for a strong bond.

Likewise, a first component 4 may be formed of a thermoplastic and/or thermosetting plastic material, which may additionally have fiber reinforcement. A second component may be formed of a metallic material, a thermoplastic and/or thermosetting plastic material or the like, with or without fiber reinforcement. In one example, the first component 4 includes a thermosetting plastic material. A thermoplastic materials 35 is provided at least in a joining region 5 to improve weldability with the supporting plate 2. Both the first component 4 and the supporting plate 2 may use an interface layers 31, 35 of thermoplastic plastic material, such as illustrated in FIG. 4, having interlacing fibers 33, 36. The spatial extent of the joining region 5 herein corresponds preferably at least to the area of the supporting plate 2. Depending on the mechanical strength properties to be obtained for the weld joint, the interface layer 35 of the first component 4 may also be applied only locally in the joining region 5 a surface of the first component 4.

Figure 2:
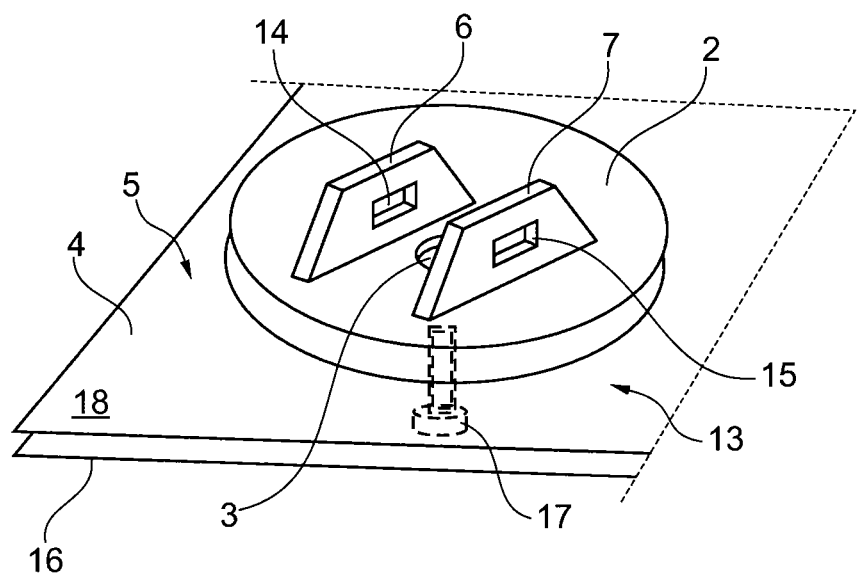
FIG. 2 shows a perspective view of an example of a supporting plate of the joining element.

On both sides of a supporting plate bore hole 3, retaining cams 6, 7 may be arranged. The retaining cams 6, 7, may have recesses 14, 15 as illustrated in FIG. 2, for example. The recesses 14, 15 are for detachably receiving a spring element 8, such as a spring element 8 having a substantially square peripheral outline for forming a detachable fastening means for a screw nut 9, as shown in FIG. 1, to be received in the joining element 1. The screw nut 9 has a bore hole 10 with an internal thread, for example. Into the internal thread, a stud 17, as shown in FIG. 2, may be screwed for joining the first component 4 to a second component 16, which may be a structural component, for example. Before the components 9, 16 are effectively tightened together, the screw nut 9 is slightly movable in two spatial directions in parallel to a top side 11 of the supporting plate 2 such that some equalization of tolerances may be allowed between the first component 4 and the second component 16 using the-joining element 1.

Both the screw nut 9 and the stud 17 may be formed of a metallic material and/or a plastic material and may additionally have fiber reinforcement for increasing mechanical load capacity.

A stud may function as a means for joining using the screw nut 9 to form a mechanical junction between the first component 4 and the second component 16.

Instead of the connecting means in the form of a screw nut 9, as well as a joining means in the shape of a stud, other connecting means and joining means may be provided. For example, the joining of a second component 16 with the first component 1 of the joining element 1 may be formed by a detachable clamping joint or the like. The second component 16 may have a latch, which is with a latching member formed and arranged between the retaining cams 6, 7. The latching mechanism may be any known latching mechanism and may be detachable, for example.

A spring element 8 may be received in recesses 14, 15 removably. For example, if the screw nut 9 is damaged during a mounting process, the screw nut 9 may easily be exchanged and replaced with a new one by taking out the spring element 8, which may be made of a wire shaped as a polygon, for example. Afterwards, the spring element 8 is again inserted into the recesses 14, 15, so that a vertex 48 portion (i.e., a corner) engages the recesses 14, 15. Thereby, for exchanging the screw nut 9, it is no longer required to detach the supporting plate 2 from the first component 4. Instead, the spring element 8 is used to retain a base plate 12.

For locking by means of the spring element 8, the screw nut 9 has a substantially rectangular base plate 12. The base plate 12 has at both ends approximately circular recesses 42. The base plate 12 rests on the top side 11 of the supporting plate 2 under the spring element 8. Thus, the screw nut 9 is securely retained by the spring element 8, such that the screw nut 9 cannot lift off vertically from the top side 11 of the supporting plate 2. The spring element 8, nevertheless, allows for the screw nut 9 to be movable in parallel to the top side 11 of the supporting plate 2 between the retaining cams 6, 7 for minor equalization of tolerances.

In one example, a supporting plate 2 including retaining cams 6, 7 is injection molded integrally using a thermoplastic material, such as one of the thermoplastic plastic materials already mentioned. Mass manufacturing of the joining element 1 is facilitated by mass production of die injection molding of the supporting plate 2 with integral cams 6,7 and recesses 14,15. In one example, the recesses 14,15 are produced by machining or stamping. The supporting plate bore 3 may likewise be formed in the course of the injection molding process or may be subsequently incorporated into the supporting plate 2, such as by machining or stamping.

Alternatively, a screw nut 9 may be realized directly during the injection molding process, in particular if it is formed of a thermoplastic plastic material. However, in this case, no equalization of tolerances and no exchange of the screw nut 9 in case of possible damage of the same is possible anymore without detaching the complete supporting plate 2 from the first component 4. Thus, for maintenance purposes it may be preferred to use a screw nut 9 retained by a spring element 8.

FIG. 2 represents a perspective view of the supporting plate 2. For better clarity of the drawing, the spring element 8 as well as the screw nut 9 are not represented. The supporting plate 2 is shown with two retaining cams 6, 7. Preferably approximately in the middle, the supporting plate bore 3 is incorporated into the supporting plate 2. A bottom side 13 of the supporting plate 5 is mechanically joined solidly to the first component 4, according to one example, by a weld joint. In the embodiment of the supporting plate 2 shown, the recesses 14, 15 have a substantially rectangular shape. In other examples, the recesses 14, 15 may have a different shape, such as a trapezoid or oval shape. The recesses 14, 15 are capable of receiving and locking a portion of the spring element 8 in a resilient or latching way for securing the screw nut 9 on the supporting plate 2. Thus, the second component 16 may be joined to the first component 4 using a stud 17, which may be a bolt, for example. For this purpose, the stud 17 may be screwed into the screw nut 9, such that the first and second components 4, 16 are rigidly clamped together. Instead of the stud 17 and the screw nut 9, other joining systems, e.g. latching or clamping joints, may be used.

Figure 3:
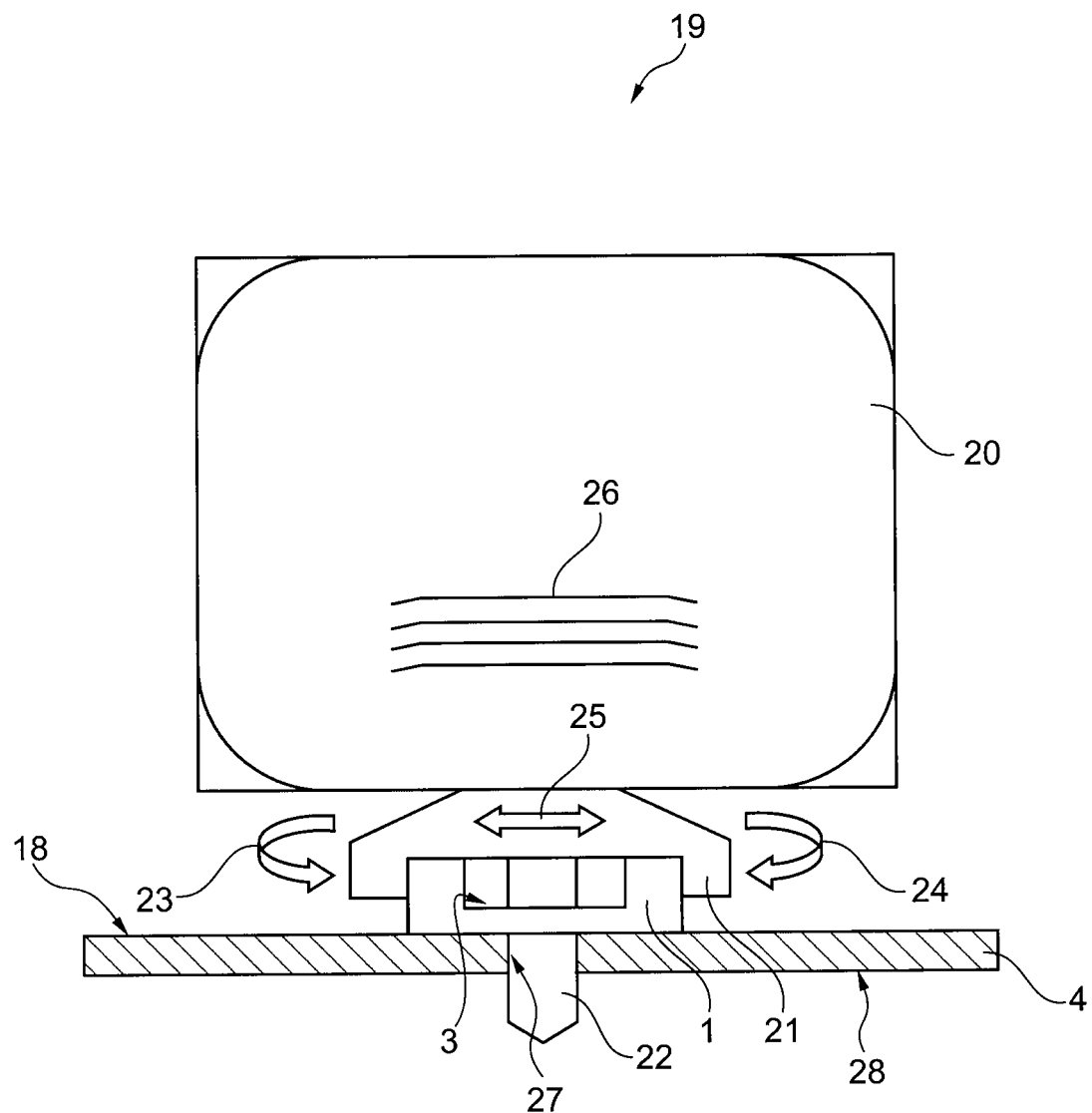
FIG. 3 shows a schematic cross-sectional illustration of an example of a device for creating a junction with the joining element.

Initially, a bore_hole 27, preferably having a diameter approximately corresponding to an external diameter of the stud 17 or a diameter of the supporting plate bore 3, is incorporated into the first component 4. A primary purpose of this bore hole 27 is for guiding and centering a tool or the device 19, as shown in FIG. 3, for example, for producing the weld joint.

According to one example, a weld joint 39 is formed between the bottom side 13 of the supporting plate 2 of the joining element 1 and the first component 4. This weld joint 39 may be produced by means of known plastic welding processes such as friction and ultrasonic welding processes. For example, the joining element 1 may be joined to the first component 4 by ultrasonic welding, high frequency welding, electric resistance welding, electric induction welding, vibration welding, or the like. Basically, any process is appropriate that effects sufficient thermal energy input in the joining region 5 such that thermoplastic material in the region of a top side 18 of the first component 4 and in the region of the bottom side 13 of the supporting plate 2 is at least superficially softened for a proper welding operation.

At least in the joining region 5 each of the surfaces of the supporting plate 2 and the first component 4 are formed of a thermoplastic plastic material, such as polyetheretherketone (PEEK) and/or a material of polyetherimide (PEI), enabling an intimate and mechanical load bearing thermal weldment at the weld joint 39. Both the first component 4 and the supporting plate 2 may herein also have fiber reinforcement, for example.

If the first component 4 comprises a thermosetting plastic material, e.g., a carbon fiber reinforced epoxy resin (CFK) or the like, a thermoplastic material is included at least in the joining region 5 at as an interface layer 35. In one example, a thermoplastic material is spread or applied on the top side 18 of the first component 4 in the joining region 5. The interface layer 39 is formed of a thermoplastic plastic material, such as polyetheretherketone (PEEK) and/or polyetherimide (PEI), and enables an intimate, high mechanical load bearing thermal welding of a component 4 with the supporting plate 2 of the joining element 1. In order to achieve this, the plate is also formed of a thermoplastic material, such as one of the above-mentioned thermoplastic materials, at least in the region of the bottom side 13 that is in the joining region 5.

In another step, for fastening the stud 17 in the second component 16, another bore is incorporated into the second component 16. For completing the junction, the second component 16 is then screwed together with the screw nut 9 in a known manner using the stud 17.

For further simplification and rationalization of the joining operation, instead of a screw joint, also clamping or latching joints of any kind may be provided.

In addition, in one example, no bore is incorporated into the first component 4 at the start of the process. This bore may be formed with an appropriate tool during the welding operation, simplifying the process sequence. Likewise it is not necessary for the supporting plate 2 to be provided with a supporting plate bore hole 3 during the production process. Instead, a bore hole 3 may be incorporated during the welding operation.

FIG. 3 shows a schematic cross-sectional illustration of a embodiment of a device for creating a junction using a joining element 1.

For example, a device 19 comprises a drive unit 20 and a clamping device 21 for non-positive seating of the joining element 1. The clamping device 21 has clamping members well known in the art and not represented in detail in FIG. 3, by means of which the joining element 1 is clamped securely to the joining element 1. The clamping device 21 is preferably realized for receiving a plurality of different types of joining elements having various dimensions and/or geometric shapes. In addition, in a preferred embodiment, the clamping device 21 has a pilot pin 22 for guiding and centering the joining element 1 with respect to the first component 4.

For performing the welding operation between the joining element 1 and the first component 4, the clamping device 21 may be actuated by means of the drive unit 20 in linearly and/or rotationally oscillating movements or vibrations. The spatial orientation of such linearly and/or rotationally oscillating movements or vibrations in space is indicated by the arrows 23 to 25, for example. Herein, the arrows 23, 24 symbolize the rotationally oscillating reciprocations of the clamping device 21 relatively to the top side 18 of the first component 4, whereas the arrow 25 represents the linearly oscillating reciprocations relatively to the top side 18.

For the rotational movements, the term "oscillating" means that the clamping device 21 does not perform complete rotations in the direction of the arrows 23, 24, but is vibratingly moved by the drive unit 20, respectively only by small angular increments around a vertical rotational axis. Accordingly, the clamping device 21 together with the joining element 1 non-positively received therein vibrates substantially in parallel to the arrow 25 towards the first component 4 in small longitudinal increments. The amplitude of such linearly and/or rotationally oscillating movements of the clamping device 21 is a maximum of 1 mm, for example. However, the movements or vibrations of the clamping device 21 are taking place herein at a comparatively high frequency, e.g. in the order of up to 100 kHz, for example.

In addition to the linearly and/or rotationally oscillating movements of the clamping device 21, which are illustrated by the arrows 23 to 25, the drive unit 20 may also move the clamping device 21 vibratingly up and down in the vertical direction, i.e. substantially perpendicularly, to the top side 18 of the first component 4, as indicated by the four lines 26. The amplitude of this up and down movements of the clamping device 21 also only reaches relatively small increments, e.g., a maximum of 0.1 mm, for example. The frequency of the up and down movements may herein be of up to 200 kHz, for example. The vibratory up and down movements, which are taking place substantially perpendicularly to the top side 18 of the first component 4, affect an intensification of the welding operation between the joining element 1 and the first component 4 due to higher energy input.

Herein, the linearly oscillating movements, the rotationally oscillating movements, as well as the vertically vibratory movements of the clamping device 21 may also be generated by the drive unit 20 simultaneously or successively in any possible combination and preferably at the same time in a single welding operation.

The pilot pin 22 may be used for guiding the device 19 and/or the joining element 1 for incorporation thereof into a bore 27 previously incorporated into the first component 4. The pilot pin 22 then penetrates the supporting plate bore 3 in the joining element 1. If the bore 27 in the first component 4 in the joining element 1 has not been previously incorporated, then the clamping device 21 may comprise a boring fixture, not represented, for incorporating the bore 27 into the first component 4. Correspondingly, the supporting plate bore 3 may be incorporated into the supporting plate 2 only when mounting the joining element 1, in one example.

In another alternative embodiment, the pilot pin 22 may at the same time be realized as a boring fixture and thus combine therein the guiding and centering function as well as the boring function. Preferably, a pilot pin 22 realized as a boring fixture may comprise a small centering tip, which at the beginning ensures secure guiding or positioning of the device 19 on the top side 18 of the first component 4.

According to another alternative embodiment, the boring fixture as well as the device 19 for creating a junction between the first component 4 and the joining element 1 may also be functionally separate from each other. In this case, at the beginning of the welding operation, a bore 27 is not required in the first component 4, and the pilot pin 22 may be omitted. Then, a bore hole 27 is only incorporated into the joining element 1 and the first component 4 after complete termination of the welding operation being performed between the joining element 1 and the first component 4.

In addition, for performing the welding operation, a counter piece, not plotted in the illustration of FIG. 3, may be provided, which largely prevents a deflection of the first component 4. For this purpose, the counter piece is at least locally adjacent to a bottom side 28 of the first component 4.

During the welding operation, the drive unit 20 may be controlled by a control and regulation device, not represented. By means of the control and regulation device, in particular the amplitude and/or frequency of the linearly and/or rotationally oscillating movements of the clamping device 21 may be controlled. This applies similarly to the vertically vibratory movements of the clamping device 21, which are indicated by the family of lines 26. The control and regulation device has operating elements as well as signal transmitters, not represented in further detail that are well known in the art. Using the control and regulation device, the welding operation may be triggered and the proper termination thereof may be displayed. In addition, by means of the control and regulation device, the amplitude and/or frequency of the linearly and/or rotationally oscillating movements may be preselected easily by parameterization, depending on the quality of material of the first component 4 and the joining element 1, and monitored during the welding operation in order to ensure at all times optimal execution of the welding operation independently of the present combination of materials. This applies similarly to the amplitude and frequency of the vertical vibratory movements of the clamping device 21.

In addition, it may be provided for a user to specify simple abbreviations or material designations in full text for the materials of the supporting plate 2 and the first component 4, and for the control and regulation device then to automatically selects from a characteristic diagram the above-mentioned parameters of the welding operation, in particular, frequency and amplitude of the linearly and/or rotationally oscillating movements and the vibratory movements of the clamping device 21, for optimal execution.

Finally, by means of the control and regulation device, if necessary, one may set and monitor the pressure such that the joining element 1 is pressed by the clamping device 21 onto the top side 18 of the first component 4 during the welding operation.

The device 19, schematically represented in FIG. 3, for performing the welding operation between the joining element 1 and the first component 4 only represents a sample embodiment enabling a welding operation by friction welding. Alternatively, devices by means of which, a junction between the joining element 1 and the first component 4 may be formed by high frequency welding, ultrasonic welding, electric resistance welding, electric induction welding, vibration welding, or the like.

It should be noted that the term "comprising" does not exclude other elements or steps and the "a" or "an" does not exclude a plurality. Also elements described in association with different embodiments may be combined.

The term, "substantially at the same time," is a term understood by a person of ordinary skill in the art, to mean not simultaneously, but within approximately within a few seconds of each step in the method for joining a first component to a second component.

It should also be noted that reference signs in the claims shall not be construed as limiting the scope of the claims.

Alternative combinations and variations of the examples provided will become apparent based on this disclosure. It is not possible to provide specific examples for all of the many possible combinations and variations of the embodiments described, but such combinations and variations may be claims that eventually issue.

What is claimed is:

1. An assembly comprising: a first plate-shaped plastic component and a second plate-shaped component, adjacent to each other and coupled to each other by a joining element, wherein the first component incorporates a bore hole completely therethrough, and wherein the second component incorporates a bore hole completely therethrough; and wherein the joining element further comprises:
    a supporting plate being welded to a surface of the first component which faces away from the second component, the supporting plate comprising a bore hole extending completely through the supporting plate, and a plurality of retaining means around the bore hole of the supporting plate;
        wherein the bore hole of the supporting plate is aligned with the bore hole in the first component and the bore hole in the second component; and wherein the joining element further comprises:
    a connecting means including a joining component retained in the supporting plate and extending through the boreholes of the first component and the second component and connecting the supporting plate to the second component, and
        wherein the connecting means is configured to be removably retained in the supporting plate after the supporting plate has been welded to the first component.

2. The assembly according to claim 1, wherein the supporting plate, the connecting means, or a combination thereof, are formed of a thermoplastic material, a thermosetting material, or a combination thereof.

3. The assembly according to claim 1, wherein the supporting plate, or the connecting means, or a combination thereof include a fiber reinforcement.

4. The assembly according to claim 1, wherein the supporting plate, the connecting means, or a combination thereof are formed of a polyetheretherketone, a polyetherimide or a combination thereof.

5. The assembly according to claim 1, wherein the retaining means comprises at least two retaining cams, arranged outwardly from a surface of the supporting plate and laterally with respect to the bore hole, each of the at least two retaining cams, respectively, comprising a recess; and
    a fastening element for detachably fastening the means for connecting the supporting plate to the second component is removably retained in the at least two retaining cams.

6. The assembly according to claim 1, wherein the connecting means includes a screw nut.

7. The assembly according to claim 6, wherein the joining component is a stud having a threaded end and a head, the threaded end is capable of being screwed into the screw nut, the threaded end of the stud being inserted from a side of the assembly opposite of the supporting plate, the threaded end extending through the bore hole in the second component, through the bore hole in the first component and through the bore hole in the supporting plate and engaging the screw nut such that the head of the stud is disposed on the side of the assembly opposite of the supporting plate, and the first component is rigidly secured to the second component.

8. A method that uses the assembly of claim 1 for joining the first component formed of a plastic material to the second component, the method comprising:
    aligning the bore hole in the first component formed of the plastic material with the bore hole in the second component:
    welding the supporting plate of the assembly of claim 1 to a first surface of the first component;
    arranging a second surface of the first component, which is opposite to the first surface, adjacent to the second component;
    detachably receiving the means for connecting the supporting plate to the second component including the joining component retained in the supporting plate and extending through the boreholes of the first component and the second component and in the plurality of retaining means around the bore hole of the supporting plate;
    joining the first component and the second component by coupling the second component to the supporting plate using the connecting means for connecting the supporting plate to the second component; and
    removably retaining the connecting means in the supporting plate after the supporting plate has been welded to the first component.

9. The method according to claim 8, further comprising: providing the first component, wherein the first component is formed of a thermosetting plastic material, with an interface layer of a thermoplastic material, in a joining region of the first component, before welding the supporting plate to the first component in the joining region of the first component.

10. The method according to claim 8, wherein the steps of welding the supporting plate to the first component and incorporating the bore hole into the first component take place substantially at the same time.

11. The method according to claim 8, wherein the step of welding the supporting plate to the first component includes friction welding.

* * * * *